3,574,836
Patented Apr. 13, 1971

3,574,836
COMPOSITIONS COMPRISING HYDROCHLORO-THIAZIDE AND 3,4-DIHYDRO-2(1H)ISOQUINO-LINE CARBOXAMIDE
William Bernard Abrams, South Orange, and Sven Evert Svenson, North Caldwell, N.J., assignors to Hoffmann-La Roche Inc., Nutley, N.J.
No Drawing. Continuation-in-part of abandoned application Ser. No. 418,529, Dec. 15, 1964. This application Nov. 26, 1968, Ser. No. 779,261
Int. Cl. A61k 27/00
U.S. Cl. 424—246        10 Claims

ABSTRACT OF THE DISCLOSURE

Compositions are described which contain 6-chloro-3,4-dihydro-7-sulfamyl-2H-1,2,4-benzothiadiazine 1,1-dioxide, or a non-toxic alkali metal salt thereof, and 3,4-dihydro-2(1H)-isoquinoline carboxamidine, or an acid addition salt thereof, as the active ingredients. The composition is useful in the treatment of the symptoms of hypertension.

RELATED APPLICATIONS

This application is a continuation-in-part of U.S. patent application Ser. No. 418,529 filed Dec. 15, 1964, now abandoned.

SUMMARY OF THE INVENTION

This invention relates, in general, to novel pharmaceutical compositions. More particularly, the invention relates to therapeutically active compositions which are especially well suited for use in the treatment of hypertension.

6-chloro-3,4-dihydro - 7 - sulfamyl-2H-1,2,4-benzothiadiazine 1,1-doxide, or as it is more commonly referred to, hydrochlorothiazide, and non-toxic alkali metal salts thereof, are known compounds which have pronounced diuretic activity. For convenience, the term hydrochlorothiazide will be used, at times, in this specification to denote both 6-chloro-3,4-dihydro-7-sulfamyl-2H-1,2,4-bezothiadiazine 1,1-dioxide and its non-toxic alkali metal salts.

Moreover, 3,4 - dihydro - 2(1H)isoquinoline carboxamidine, and medicinally acceptable acid addition salts thereof, have been disclosed previously in the literature. This base, and its salts, are hypotensive adrenergic blocking agents. They produce a post-ganglionic blockage of sympathetic nerve transmission, without depending on the simultaneous depletion of major catecholamine stores in cardiovascular tissue. For convenience, the term debrisoquin will be used, at times, in this specification to denote both 3,4-dihydro-2(1H)isoquinoline carboxamidine and its medicinally acceptable acid addition salts.

It has now been found that when hydrochlorothiazide or a non-toxic alkali metal salt thereof, and 3,4-dihydro-2(1H)isoquinoline carboxamidine, or a medicinally acceptable acid addition salt thereof, are used in combination, the symptoms of hypertension, particularly in the most extreme cases, are more effectively controlled.

Thus, in its most comprehensive embodiment, the present invention is concerned with pharmaceutical compositions containing hydrochlorothiazide, in combination, either with 3,4-dihydro-2(1H)isoquinoline carboxamidine or with one of its medicinally acceptable acid addition salts.

In a more particular embodiment, the invention is concerned with pharmaceutical compositions, formulated into suitable dosage forms, particularly, oral dosage forms, which compositions have hydrochlorothiazide present therein in admixture either with 3,4-dihydro-2(1H)iso- quinoline carboxamidine or with an acid addition salt thereof.

Still further embodiments of the invention reside in the methods and techniques used in formulating such pharmaceutical compositions into suitable dosage forms, particularly, into oral dosage forms, and in the use of such compositions in the treatment and control of hypertension.

DETAILED DESCRIPTION OF THE INVENTION

Hydrochlorothiazide, that is, 6 - chloro-3,4-dihydro-7-sulfamyl-2H-1,2,4-benzothiadiazine 1,1-dioxide, or a non-toxic alkali metal salt thereof is an essential ingredient of the compositions of this invention. Included among the non-toxic alkali metal salts which are suitable for use herein are the sodium, potassium and lithium salts of hydrochlorothiazide. In producing the preferred products of the invention, however, hydrochlorothiazide itself, rather than an alkali metal salt thereof, is used.

Furthermore, 3,4 - dihydro-2(1H)isoquinoline carboxamidine, either in the form of a free base or in the form of a medicinally acceptable acid addition salt, is used in the practice of this invention. The expression "medicinally acceptable acid solution salt," as used herein, denotes salts of 3,4-dihydro-2(1H)isoquinoline carboxamidine with a medicinally acceptable acid. Suitable for use are salts of 3,4-dihydro-2(1H)isoquinoline carboxamidine with a conventional mineral acid such as hydrochloric acid, hydrobromic acid, hydroiodic acid, hydrofluoric acid, sulfuric acid, nitric acid, phosphoric acid, etc. Suitable for use also are salts of 3,4-dihydro-2(1H)-isoquinoline carboxamidine with a conventional organic acid such as benzoic acid, alkyl and mono-aryl sulfonic acids such as ethane sulfonic acid, toluene sulfonic acid, benzene sulfonic acid as well as acetic acid, tartaric acid, maleic acid, citric acid, salicylic acid, ascorbic acid, etc. In producing the preferred products of the invention, however, a salt of 3,4-dihydro-2(1H)isoquinoline carboxamidine with sulfuric acid is employed.

The compositions of this invention are readily prepared. The process, in its broadest embodiment, comprises simply admixing hydrochlorothiazide with 3,4-dihydro-2(1H)isoquinoline carboxamidine or with a medicinally acceptable acid addition salt thereof. The mixture is ultimately embodied into a dosage form which is suitable for appropriate administration. Thus, for example, the compositions, compounded with conventional inert adjuvants, can be compressed by usual methods into single or multi-layer tablets or, in the alternative, they can be produced in the form of coated tablets. Additionally, the compositions of this invention can be incorporated into conventional hard shell capsules. Furthermore, if desired, the compositions of this invention can be provided in the form of solutions, suspensions and dispersions, using liquid vehicles which are appropriate for medicinal uses. Finally, the compositions can be formulated by conventional methods and techniques for parenteral administration. In general, all of the various dosage forms of the compositions of the present invention are prepared by known procedures and techniques. The applicability of such methods and techniques to the embodiment of the compositions of the present invention into appropriate dosage forms will be readily apparent to those skilled in the art.

In addition to the therapeutically active ingredients mentioned heretofore, the compositions of this invention can contain, as optional ingredients, any of the various adjuvants which are used ordinarily in the production of the pharmaceutical preparations. Thus, for example, in formulating the present compositions into desired dosage forms, one can use as optional ingredients fillers such as co-precipitated aluminum hydroxide-calcium carbonate, dicalcium sulfate, lactose, etc.; disintegrating agents such as maize starch; and lubricating agents such as talc, calcium stearate, etc. It should be fully understood, however, that the optional ingredients named herein are given by way of example only and that the invention is not restricted to the use thereof. On the contrary, other such adjuvants, the identity and nature of which are well known in the art, can be, and are used in carrying out this invention.

The proportions in which the therapeutically active components are present in the compositions of this invention are variable within wide limits. For example, the composition can contain a ratio of from about 0.3 to about 4.0 parts by weight of hydrochlorothiazide, in non-salt form, for each part by weight of 3,4-dihydro-2(1H) isoquinoline carboxamide, in the form of the free base. Where a non-toxic alkali metal salt of hydrochlorothiazide is employed, the quantity of salt used should be sufficient to provide the equivalent of from about 0.3 to about 4.0 parts by weight of free hydrochlorothiazide for each part by weight of 3,4-dihydro-2(1H)isoquinoline carboxamidine. On the other hand, where an acid addition salt of 3,4 - dihydro - 2(1H)isoquinoline carboxamidine is employed, a sufficient quantity of salt should be employed to provide the equivalent of 1.0 part by weight of 3,4-dihydro-2(1H)isoquinoline carboxamidine free base for each 0.3 to 4.0 parts by weight of hydrochlorothiazide. The preferred compositions of the invention, however, contain a ratio of from about 0.6 to about 3.5 parts by weight of hydrochlorothiazide for each part by weight of 3,4-dihydro-2(1H)isoquinoline carboxamide. The most preferred compositions of the invention, however, contain a ratio of from about 0.625 to about 3.3 parts by weight of hydrochlorothiazide for each part by weight of 3,4-dihydro-2(1H)isoquinoline carboxamidine.

The compositions of the present invention are provided, preferably, in solid oral dosage form, that is either as tablets or embodied in hard shell capsules. The products, in preferred solid, oral dosage form, contain from about 10.0 mg. to about 60 mg. of the therapeutically active hydrochlorothiazide component and from about 15 mg. to about 30 mg. of the therapeutically active 3,4-dihydro-2(1H)isoquinoline carboxamidine component. Tablets containing about 20 mg. of 3,4-dihydro-2(1H)isoquinoline carboxamidine and either about 12.5 mg., about 25.5 mg. or about 50 mg. of hydrochlorothiazide, or an equivalent quantity of a salt of either, are the preferred compositions of the invention. Capsules containing about 20 mg. of 3,4-dihydro-2(1H)isoquinoline carboxamidine and about 12.75 mg., 25.5 mg. or 51.0 mg. of hydrochlorothiazide are additional examples of preferred compositions of the invention.

Typical oral dosages of the compositions of this invention will vary depending upon the needs, requirements and the condition of the hypertensive patient, as diagnosed by the prescribing physician. For example, in the case of a tablet containing (a) either about 20 mg. of 3,4-dihydro-2(1H)isoquinoline carboxamidine or a quantity of a salt thereof providing the equivalent of 20 mg. of the free carboxamidine and (b) either 12.5 mg. of hydrochlorothiazide or a quantity of a salt thereof providing the equivalent of 12.5 mg. of free hydrochlorothiazide, administration of such tablet, one time per day has been found to be effective in controlling the symptoms of mild hypertension. If desired, however, such a tablet could be administered more frequently, for example, up to about eight times a day depending upon the needs of the patient. In the case of a tablet containing 20 mg. of 3,4-dihydro-2(1H)isoquinoline carboxamidine or an equivalent quantity of a salt thereof and about 25.5 mg. of hydrochlorothiazide, or an equivalent quantity of a salt thereof, two of such tablets can be administered up to about four times a day. The administration of the compositions of the invention in capsule form is similarly adjustable to satisfy the needs of the patent. The foregoing notwithstanding, however, it should be fully understood that the dosages set forth herein are exemplary only and that the disclosure thereof does not to any extent limit the scope or the practice of the present invention.

As indicated heretofore, the products of this invention possess antihypertensive properties and as such they have been found to be well suited for use in the treatment of hypertension. While the precise manner in which the combination operates when administered to hypertensive patients has never been ascertained, it has been found that the compounds when administered in combination control or at least substantially minimize the symptoms of hypertension far more effectively than either one when administered alone. Hydrochlorothiazide appears to potentiate the blood pressure lowering properties of 3,4-dihydro-2(1H)isoquinoline carboxamidine and of medicinally acceptable acid addition salts thereof. Additionally, hydrochlorothiazide serves to smooth out or to make more uniform the blood pressure lowering properties of 3,4-dihydro-2(1H)isoquinoline carboxamidine and of its medicinally acceptable acid addition salts. Thus, the compositions of the invention are well suited for use as antihypertension agents.

The following results of clinical studies illustrate the efficacy of the preferred embodiments of the invention.

METHOD AND MATERIAL

A total of 33 patients were included in a study designed to compare the antihypertensive effects of placebo, hydrochlorothiazide and a combination of debrisoquin plus hydrochlorothiazide. Patients ranged in age from 27 to 72 years. Diagnoses included benign essential hypertension, sub-malignant essential hypertension, renal hypertension and both essential and renal hypertension. Duration of hypertension ranged from six months to ten years.

The study was single-blind in design; only the patients were unaware of which medication was being administered. The three test medications were supplied in identically appearing tablet form with each tablet containing either 12.5 mg. hydrochlorothiazide, a combination of 20 mg. debrisoquin plus 12.5 mg. hydrochlorothiazide, or placebo. Patients who were taking antihypertensive drugs discontinued their medication for ten days prior to initiation of the study. Body weights were recorded and blood pressures were taken in both the supine and the standing position.

There were 33 patients who received the three medications in the following order: placebo, 12.5 mg. hydrochlorothiazide and 20 mg. debrisoquin plus 12.5 mg. hydrochlorothiazide. Prior to administration of the first test drug, the following laboratory tests were done: urinalysis, complete blood count, SGO-T and BUN. Patients were instructed to take one tablet of the first medication (placebo) daily after breakfast and return in one week. Duration of treatment was four weeks in all but two patients, one who received placebo for two weeks and one, for five weeks. Dosage was maintained at one tablet a day in all but three patients who doubled the dosage during the third treatment week. (Throughout the study period, dosage was adjusted when necessary according to response to treatment.) Tablets of 12.5 mg. hydrochlorothiazide were substituted for placebo at the end of the first treatment period and patients were instructed to take one tablet a day following breakfast. This dosage was maintained in all but one patient who received twice this amount after the first week of treatment. Duration of treatment with hydrochlorothiazide was four weeks in 31 patients, five weeks in one and two weeks in one. Laboratory studies done prior to the study period were repeated after two or three weeks of treatment with hydrochlorothiazide. The third medication, a combination of debrisoquin and hydrochlorothiazide, was given for from five to ten weeks. Dosage was one tablet a day in 19 patients; three patients received one-half to one tablet a day, seven received from one to two tablets a day and four received from one to three tablets a day depending on the response to treatment. Laboratory studies were repeated again during this treatment period, usually during the fourth week.

RESULTS

Blood pressure recordings before drug treatment and at the end of treatment showed that debrisoquin in combination with hydrochlorothiazide has a potent hypotensive effect. During treatment with placebo there was no significant change in either the systolic nor diastolic levels. Administration of hydrochlorothiazide alone lowered the blood pressure to a greater degree when patients were in the standing position than when in a supine position. The antihypertensive effects of hydrochlorothiazide were not as potent, however, as those exerted by the combination of debrisoquin and hydrochlorothiazide. After about one week following the administration of the second tablet, which contained hydrochlorothiazide, the increased urinary output fell off after about one week and the output remained fairly stationary. At the time when debrisoquin was added, with very few exceptions, not only was the blood pressure lowered, but there was also an increase once again in the urinary output. The average pre-therapy blood pressure in the supine position for the patients was 181/112 and for the standing position, 178/113. These averages were reduced to 176/112 for the supine position and 163/109 for standing following therapy with hydrochlorothiazide alone. Following treatment with the combined medication, these averages were further reduced—156/101 for the supine position and 141—97 for standing.

Side effects occurred in nine patients taking debrisoquin plus hydrochlorothiazide. These included dizziness in nine, weakness in one and headache in one. These effects were generally mild and transient and in no patient necessitated the discontinuation of treatment.

Patients with "moderately severe" or "severe" hyptertension were placed on continuous doses of debrisoquin. All other antihypertensive medications were discontinued for at least three weeks prior to beginning treatment with debrisoquin. The drug was begun in a dose of 20 mg. twice daily and increased every two weeks by 10- to 20-mg. increments per dose until the diastolic pressure in the erect position fell below 100 mm. Hg or orthostatic symptoms appeared. Twelve patients received debrisoquin alone for periods of four to 10 months. Ten of these, plus six additional patients, later received hydrochlorothiazide, 50 mg. twice daily, in addition to debrisoquin.

During the treatment period the patients were examined at two-week intervals. The blood pressure was measured in the supine position following a ten-minute rest period. Blood pressure readings were then taken with the patient sitting, and after two minutes of quiet standing. The average of the readings taken during the last two clinic visits in the treatment period were used for comparison with the pretreatment values. Blood hemoglobin concentration, white blood cell count, urinalysis, blood urea nitrogen, alkaline phosphatase, serum glutamic oxaloacetic transaminase and bromsulphalein determinations were obtained at two-month intervals.

The blood pressure control achieved with debrisoquin alone was unsatisfactory because of the lack of antihypertensive effect when the patients were in the supine position. For this reason, hydrochlorothiazide was added in a dose of 50 mg. twice daily. The combination of the two drugs resulted in a reduction in the erect position averaging 64/40 mm. Hg as compared to 41/29 on debrisoquin alone, as well as a fall in the supine position averaging 26/23 mm. Hg.

The following table sets forth the combined dosages utilized in these clinical studies.

| Hydrochlorothiazide, mg./day | Debrisoquin, mg./day | Ratio |
| --- | --- | --- |
| 100 | 60 | 1.7-1 |
| 100 | 50 | 2-1 |
| 100 | 80 | 1.25-1 |
| 100 | 70 | 1.4-1 |
| 100 | 30 | 3.3-1 |
| 100 | 140 | 0.7-1 |
| 100 | 150 | 0.66-1 |
| 100 | 40 | 2.5-1 |
| 6.25 | 10 | 0.625-1 |
| 12.5 | 20 | 0.625-1 |
| 25 | 40 | 0.625-1 |
| 37.5 | 60 | 0.625-1 |

For a fuller understanding of the nature and objects of this invention, reference may be had to the following examples which are given merely as further illustrations of this invention and are not to be construed in a limiting sense. All parts given in the examples are parts by weight unless otherwise indicated.

Example 1

(a) In this example, 12.50 parts of hydrochlorothiazide and 26.11 parts of the sulfate salt of 3,4-dihydro-2(1H)isoquinoline carboxamidine were blended with the following named ingredients in the proportions hereinafter indicated:

| | Parts |
| --- | --- |
| Corn starch (pregelatinized) | 12.000 |
| Corn starch | 55.000 |
| Dicalcium phosphate | 67.882 |

The mixture was milled and subsequently granulated with distilled water containing 0.008 part of FFD and C Red Dye No. 2. The wet granulation was subsequently passed through a Fitzpatrick grinding mill, following which it was dried overnight at a temperature of 110° F. The dry granulation was then passed through a Fitzpatrick grinding mill and thereafter 1.5 parts of calcium stearate was added thereto. The mixture was subsequently compressed using a conventional rotary tablet machine to provide tablets of 175 mg. weight.

(b) Tablets of 250 mg. weight were prepared by a procedure identical to that described in the preceding paragraph. In the formulation of the 250 mg. tablets, 25.50 parts hydrochlorothiazide and 26.11 parts of the sulfate salt of 3,4-dihydro-2(1H)isoquinoline carboxamidine were admixed with the following named ingredients in the quantities hereinafter indicated:

| | Parts |
| --- | --- |
| Corn starch (pregelatinized) | 14.000 |
| Corn starch | 64.000 |
| Dicalcium phosphate | 118.243 |

This mixture was milled and subsequently granulated with distilled water containing 0.1176 part of FD and C Red Dye No. 2 and 0.0294 part of FD and C Red Dye No. 4. Thereafter, the wet granulation was passed through a Fitzpatrick grinding mill, following which the granulation was dried overnight at a temperature of 110° F. The dry granulation was then passed through a Fitzpatrick grinding mill and 2.0 parts of calcium stearate was added thereto. The mixture was then compressed to tablets of 250 mg. weight using a conventional rotary tablet machine.

Example 2

This example is included herein to illustrate three embodiments of the invention where the compositions of the invention are embodied in hard shell capsules.

In one such instance, there was prepared a mixture of 26.52 parts of the sulfate salt of 3,4-dihydro-2(1H)isoquinoline carboxamidine, 51.00 parts of hydrochlorothiazide, 142.48 parts of lactose, 100.00 parts of corn starch and 10.00 parts of talc. This mixture was milled and 330 mg. of the mixture was passed into individual hard shell capsules by conventional procedures.

By the method described in the preceding paragraph, two additional encapsulated products were prepared. The ingredients used in preparing these compositions and the quantities thereof employed were as follows:

|  | 1, parts | 2, parts |
|---|---|---|
| 3,4-dihydro-2(1H)isoquinoline carboxamidine sulfate | 26.52 | 26.52 |
| Hydrochlorothiazide | 25.50 | 12.75 |
| Lactose | 167.98 | 180.73 |
| Corn starch | 100.00 | 100.00 |
| Talc | 10.00 | 10.00 |

The powders thus obtained were milled and, subsequently, 330 mg. of the mixture was passed by conventional means into individual hard shell capsules.

We claim:
1. A pharmaceutical composition for treating hypertension comprising (a) a member selected from the group consisting of 6-chloro-3,4-dihydro-7-sulfamyl-2H-1,2,4-benzothiadiazine 1,1-dioxide and a non-toxic alkali metal salt thereof and (b) a member selected from the group consisting of 3,4-dihydro-2(1H)isoquinoline carboxamidines and a salt thereof with a medicinally acceptable acid, there being present in said composition the equivalent of from about 0.3 to about 4.0 parts by weight of 6-chloro-3,4-dihydro-7-sulfamyl-2H-1,2,4-benzothiadiazine 1,1-dioxide for each part by weight of 3,4-dihydro-2(1H)isoquinoline carboxamidine.

2. The pharmaceutical composition in accordance with claim 1 wherein there is present in said composition the equivalent of from about 0.6 to about 3.5 parts by weight of 6-chloro-3,4-dihydro-7-sulfamyl-2H - 1,2,4 - benzothiadiazine 1,1-dioxide for each part by weight of 3,4-dihydro-2(1H)isoquinoline carboxamidine.

3. A pharmaceutical composition for treating hypertension, in unit dosage form, comprising (a) a member selected from the group consisting of 6-chloro-3,4-dihydro-7-sulfamyl-2H-1,2,4-benzothiadiazine 1,1-dioxide and a non-toxic alkali metal salt thereof and (b) a member selected from the group consisting of 3,4-dihydro-2(1H) isoquinoline carboxamidine and a salt thereof with a medicinally acceptable acid, there being present in said composition the equivalent of from about 0.3 to about 4.0 parts by weight of 6-chloro-3,4-dihydro-7-sulfamyl-2H-1,2,4-benzothiadiazine 1,1-dioxide for each part by weight of 3,4-dihydro-2(1H)isoquinoline carboxamidine.

4. The pharmaceutical composition in accordance with claim 3 wherein there is present in said composition the equivalent of from about 0.6 to about 3.5 parts by weight of 6-chloro-3,4-dihydro-7-sulfamyl-2H - 1,2,4 - benzothiadiazine 1,1-dioxide for each part by weight of 3,4-dihydro-2(1H)isoquinoline carboxamidine.

5. A pharmaceutical composition for treating hypertension in tablet form comprising (a) a member selected from the group consisting of 6-chloro-3,4-dihydro-7-sulfamyl-2H-1,2,4-benzothiadiazine 1,1-dioxide and a non-toxic alkali metal salt thereof and (b) a member selected from the group consisting of 3,4-dihydro-2(1H)isoquinoline carboxamidine and a salt thereof with a medicinally acceptable acid, there being present in said composition the equivalent of from about 0.3 to about 4.0 parts by weight of 6-chloro-3,4-dihydro-7-sulfamyl - 2H - 1,2,4-benzothiadiazine 1,1-dioxide for each part by weight of 3,4-dihydro-2(1H)isoquinoline carboxamidine.

6. The pharmaceutical composition in accordance with claim 5 wherein there is present in said composition the equivalent of from about 0.6 to about 3.5 parts by weight benzothiadiazine 1,1-dioxide for each part by weight of 3,4-dihydro-2(1H)isoquinoline carboxamidine.

7. A pharmaceutical composition for treating hypertension in unit dosage form comprising (a) 6-chloro-3,4-dihydro-7-sulfamyl-2H-1,2,4 - benzothiadiazine 1,1 - dioxide and (b) the sulfate salt of 3,4-dihydro-2(1H)isoquinoline carboxamidine, there being present in said composition the equivalent of from about 0.3 to about 4.0 parts by weight of said 6-chloro-3,4-dihydro-7-sulfamyl-2H-1,2,4-benzothiadiazine 1,1-dioxide for each part by weight of of 6 - chloro - 3,4-dihydro-7-sulfamyl-2H-1,2,4-benzothiadiazine 1,1-dioxide for each part by weight of 3,4-dihydro-2(1H)isoquinoline carboxamidine.

8. The pharmaceutical composition in accordance with claim 7 wherein there is present in said composition the equivalent of from about 0.6 to about 3.5 parts by weight of 6-chloro-3,4-dihydro-7-sulfamyl-2H - 1,2,4 - benzothiadiazine 1,1-dioxide for each part by weight of 3,4-dihydro-2(1H)isoquinoline carboxamidine.

9. A method for treating hypertension in patients which comprises administering to said patient an anti-hypertensive amount of a composition comprising a mixture of (a) a member selected from the group consisting of 6-chloro-3,4-dihydro-7-sulfamyl-2H-1,2,4-benzothiadiazine 1,1-dioxide and non-toxic alkali metal salt thereof, (b) a member selected from the group consisting of 3,4-dihydro-2 (1H)isoquinoline carboxamidine and a salt thereof with a medicinally acceptable acid and (c) a pharmaceutically acceptable carrier, there being present in said composition the equivalent of from about 0.3 to about 4.0 parts by weight of said ingredient (a) for each part by weight of said ingredient (b).

10. The method in accordance with claim 9 wherein there is present in said composition the equivalent of from about 0.6 to about 3.5 parts by weight of said ingredient (a) for each part by weight of said ingredient (b).

References Cited

UNITED STATES PATENTS 3,157,573   11/1964   Wenner.

OTHER REFERENCES

U.S. Dispensatory, pp. 77–8 (1960).

ALBERT T. MEYERS, Primary Examiner

D. M. STEPHENS, Assistant Examiner

U.S. Cl. X.R.

424—258